United States Patent [19]

Noguchi

[11] 3,848,708
[45] Nov. 19, 1974

[54] FRICTION PAD FOR DISC BRAKE ASSEMBLY

[75] Inventor: Takeshi Noguchi, Osaka, Japan

[73] Assignee: Sumitoma Electric Industries, Ltd., Osaka, Japan

[22] Filed: June 7, 1973

[21] Appl. No.: 367,989

[30] Foreign Application Priority Data
June 7, 1972  Japan................................ 47-66934

[52] U.S. Cl............ 188/73.1, 188/73.5, 188/250 B
[51] Int. Cl............................................ F16d 65/02
[58] Field of Search............. 188/73.1, 250 B, 73.5, 188/205 A, 72.1

[56] References Cited
UNITED STATES PATENTS

| | | | |
|---|---|---|---|
| 3,027,979 | 4/1962 | Pocock | 188/73.1 |
| 3,162,271 | 12/1964 | Hanson | 188/73.1 |
| 3,552,526 | 1/1971 | Beuchle et al. | 188/73.1 |
| 3,762,509 | 10/1973 | James et al. | 188/73.1 |

*Primary Examiner*—Trygve M. Blix
*Assistant Examiner*—Edward R. Kazenske
*Attorney, Agent, or Firm*—Sughrue, Rothwell, Mion, Zinn & Macpeak

[57] ABSTRACT

A friction pad for a disc brake assembly has a stainless metal sheet overlying the back plate of the pad with the peripheral ends of the sheet elastically bent over the ends of the back plate along at least that part of the pad whose end face a fixed guide surface of a fixed support member which mounts the friction pad for movement toward and away from the rotatable braking disc.

3 Claims, 3 Drawing Figures

PATENTED NOV 19 1974 3,848,708

FRICTION PAD FOR DISC BRAKE ASSEMBLY

BACKGROUND OF THE INVENTION

1. FIELD OF THE INVENTION

This invention relates to disc brake assemblies and, more particularly, to the friction pad whose frictional lining is pressed to a rotatable braking disc.

2. DESCRIPTION OF THE PRIOR ART

In disc brake assemblies, the disc brake is provided with a guide surface for guiding the friction pad axially with respect to the disc when the friction pad is pressed towards the braking disc by a hydraulic pressing mechanism or the like. As the guide surface is defined by a member formed of iron, it is apt to rust and the movement of the pad is obstructed by such rusting and there is a danger that as a result of excessive rusting, movement of the brake pad relative to the disc may be prevented, or the pressing force pressing a friction lining to the disc is reduced.

SUMMARY OF THE INVENTION

The present invention eliminates this drawback and prevents the rusting of the back plate and guide surface by covering the back plate with a stainless metal sheet whose periphery is bent over the ends of the back plate elastically along at least that portion of the pad whose end faces said guide surface.

The present invention makes use of a sheet normally called a shim for noise proofing or prevention of the bias wear of the pad with the peripheral end portion of the sheet being bent towards the said ends of the lining to cover the end of the back plate such that the back plate and the guide surface are not in direct engagement with each other and wherein a clearance corresponding substantially to the thickness of the sheet is provided therebetween. The bent stainless metal sheet end portion is provided with a suitable curvature where it engages the corner of the back plate such that even if rusting occurs on the guide surface, there is resiliency achieved by the curvature that insures sliding movement of comparative ease between the friction pad and the guide surface. As a result of bending, the bent end portion of the stainless steel sheet provides limited play between the pad and the guide surface, with collision between the back plate and the guide surface prevented by the elastic force, while at the same time, the elasticity provided by the curved portion prevents the generation of disagreeable noise.

DESCRIPTION OF THE PREFERRED EMBODIMENT

Figure 1:
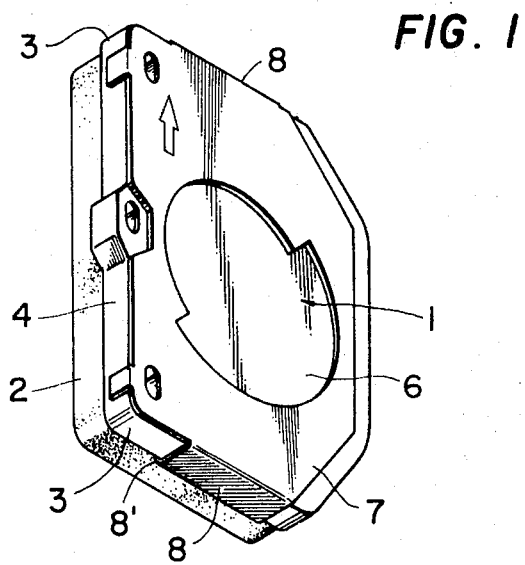
FIG. 1 is an oblique perspective view of an embodiment of the improved friction pad of the present invention from the side of the back plate.
Figure 2:
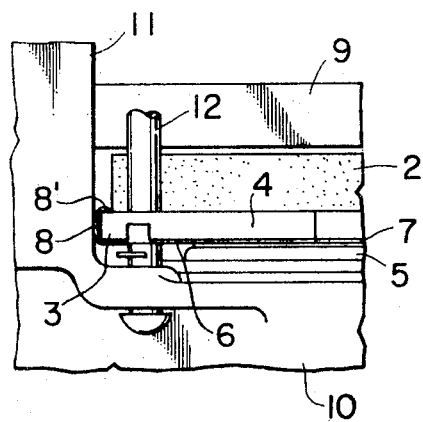
FIG. 2 is a partial view of the FIG. 1 as an element of a disc brake assembly.

A friction pad indicated generally at 1 frictionally engages a rotatable braking disc 9 to brake the disc 9 when back plate 4 is pressed towards the disc 9 by a piston (not shown) forming a part of pressing mechanism 5. This is achieved by the application, for example, of hydraulic pressure supplied to a cylinder within calliper 10 which straddles the disc 9 as seen in FIG. 2. When rust is generated on guide surfaces 11 of the calliper 10 which defines the recess receiving the friction pad, a projecting end of the back plate 4 is thereby caught on the guide surfaces 11 and the braking force which is usually generated by hydraulic pressure is lessened or may not be achieved in some cases due to excessive rust. Therefore, in the present invention, both protruding end portion 8 of a stainless steel sheet 7, which overlie back plate 4, elastically project beyond the ends 3 of the back plate 4 by bending the protruding end portions 8 of the stainless steel sheet 7 about the projecting ends 3 so that the portions cover the ends 3 with edges 8' of the protruding end portions 8 positioned near the bottom corner line of a lining 2. Thus, the stainless steel sheet 7 is fixed to the back plate 4 by the bent ends 8 of the stainless steel sheet. It is noted, that the corners of the bent ends 8 of the stainless steel sheet 7, as the ends are bent about the projecting ends 3 of the back plate 4, have relatively large curvature so that even when rust is generated on the guide surfaces 11, the movement of the pad 1 is hardly obstructed by the generated rust.

Figure 3:
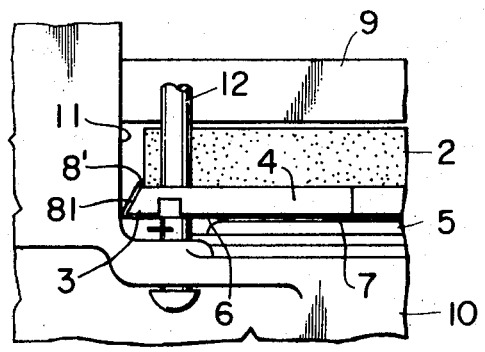
FIG. 3 is a partial view of another embodiment of the pad of the present invention.

It is further effective to reduce the resistance to guiding of the pad relative to the guide surface 11 of the calliper 10 by slanting the ends 81 of the stainless steel sheet 7 so that the clearance between the slanted end 81 of the stainless steel sheet and guide surface 11 increases in a direction towards the disc 9 as shown in FIG. 3. In practice, it is difficult to make the ends 8 of the stainless steel sheet so as to cover the projecting ends 3 of the back plate 4 with close contact to surfaces of the back plate 4 facing the guide surfaces 11, respectively, and it is usual that the ends 8 of the stainless steel sheet 7 are separated elastically from the surfaces of the back plate 4. Further, each clearance between the surface of the back plate 4 and the guide surface 11 exhibits an effect to smooth the movement of the pad 1 relative to the calliper 10. Still further, the elastic force due to the separation between the pad 1 and the ends 8 of the stainless steel sheet has the advantageous effect of causing the pad to engage elastically the pin 12 upon which the pad is supported with respect to the guide surface 11, thereby the accidental displacement of the pad 1 due to the oscillation or the like exerted on the assembly from the source exterior of the same is prevented, and the disagreeable noise generated in collision with the back plate 4 and the guide surfaces 11 is prevented.

It is the advantages of the disc brake assembly according to the present invention, which has such a structure that the ends of the back plate 4 protruding beyond the lining 2 are elastically covered with the bent ends 8 of the stainless steel sheet 7, not only so that the ends 8 always engage the back plate 4, but also that the lining 2 never directly contacts the guide surfaces 11 of the calliper 10 even when the friction pad 1 is inclined and is worn.

From the above, it is seen that the present device while eliminating the former drawbacks in a relatively easy menner, is able to bring about various advantageous effects and is very useful in actual practice.

What is claimed is:

1. In a disc brake assembly in which a friction pad is mounted in planar confronting fashion for a limited movement toward and away from a rotatable braking disc and wherein the ends of said pad move parallel to a guide surface adjacent thereto which is subject to rusting, and wherein said pad comprises a lining which faces and frictionally engages said disc and a back plate overlying the surface of said lining remote from said disc and having ends projecting beyond said lining, the improvement comprising: a stainless steel sheet overlying the back plate and having peripheral projecting end portions elastically covering the ends of said back plate along at least those portions of said back plate whose ends face said guide surface, said sheet peripheral end portions being bent over the projecting ends of said back plate with the sheet edges elastically gripping the lining side of said back plate inwardly of said back plate ends adjacent corner contact lines between said lining and said back plate with the confronting surfaces of said back plate ends and said stainless steel sheet end portions being spaced from each other such that said sheet end portions move elastically relative to the ends of said back plate to facilitate movement of said back plate relative to said guide surface regardless of rust accumulation thereon.

2. The disc brake assembly as claimed in claim 1, wherein said stainless steel sheet end portions which are bent about the ends of said back plate have a relatively large radius of curvature.

3. The disc brake assembly as claimed in claim 1, wherein: the ends of said back plate slant inwardly in the direction toward the lining and the end portions of said stainless steel sheet which are bent over the ends of said back plate, slant correspondingly to the ends of said plate such that the clearance formed between the end portions of said stainless steel sheet and the guide surface increases in a direction towards the rotatable brake disc.

* * * * *